United States Patent [19]

Maeda

[11] Patent Number: 4,496,136

[45] Date of Patent: Jan. 29, 1985

[54] HOIST

[75] Inventor: Kazuo Maeda, Yokohama, Japan

[73] Assignee: Kabushiki Kaisha Kito, Kawasaki, Japan

[21] Appl. No.: 524,636

[22] Filed: Aug. 19, 1983

[30] Foreign Application Priority Data

Aug. 25, 1982 [JP] Japan ............................... 57-146212

[51] Int. Cl.[3] .......................... B66D 1/14; F16D 7/00

[52] U.S. Cl. .................................... 254/350; 254/903; 192/48.3; 192/48.92; 192/56 R; 464/37; 464/46

[58] Field of Search ....................... 254/350, 903, 370; 192/56 R, 48.3, 48.92, 48.6; 464/46, 38, 37

[56] References Cited

U.S. PATENT DOCUMENTS

| | | | |
|---|---|---|---|
| 2,501,096 | 3/1950 | Robins et al. | 254/903 X |
| 3,072,234 | 1/1963 | Maurice et al. | 192/48.3 |
| 3,741,527 | 6/1973 | Dahl | 254/350 |
| 3,953,000 | 4/1976 | Zorbaugh | 192/56 R X |
| 4,023,744 | 5/1977 | Shutt | 254/903 X |
| 4,348,011 | 9/1982 | Honda | 254/350 |

*Primary Examiner*—John M. Jillions
*Assistant Examiner*—Joseph J. Hail, III
*Attorney, Agent, or Firm*—Sughrue, Mion, Zinn, Macpeak and Seas

[57] ABSTRACT

A hoist includes a shaft driven by external force, a driving shaft connected to the shaft, a reduction gear train for transmitting rotation of the driving shaft to a load sheave, and a mechanical brake assembly in the reduction gear train. According to the invention in the reduction gear train is arranged an overload safety device comprising a driven gear having a one-way clutch and rotatively driven by the driving shaft and radially inward and outward dual friction plates located between the driven gear and an element of the mechanical brake assembly so as to transmit torque through the radially outward friction plates in winding-up and through both the radially inward and outward friction plates in winding-off. With this arrangement, the electric hoist according to the invention is able to automatically prevent lifting, lowering and dragging a load under overload condition, and enables the once lifted load to be securely lowered irrespective of its light or heavy weight.

5 Claims, 6 Drawing Figures

HOIST

BACKGROUND OF THE INVENTION

1. Field of the Invention

This invention relates to a hoist having overload safety means for preventing lifting, lowering and dragging under overload condition and capable of securely lowering a load irrespective of its light or heavy weight.

2. Description of the Prior Art

With hoists such as electric chain blocks whose load sheave is driven through reduction gears by electric motors, it has been proposed to provide on a driven shaft of a reduction gear mechanism a brake assembly consisting of a brake support member, a brake retainer member, a brake ratchet wheel and friction plates between the members and further provide an overload safety device including frictional connections interposed between the brake retainer member and a driven gear fitted thereon, in order to prevent lifting of a load by slippage in the overload safety device when the load sheave is subjected to an overload.

With this such an electric hoist, however, the friction transmission force of the overload safety device often becomes less than that of the brake assembly owing to overtightening, so that once lifted, a load cannot be lowered due to slippage in the overload safety device.

In order to solve this problem, it has been proposed to interpose a one-way clutch between the driven gear and the brake retainer member so as to render inoperative the overload safety device when lowering the load, as disclosed for example in Japanese Patent Application Publication No. 42,937/78. In this case, however, since the overload cannot be prevented in lowering the load, it is indispensably required to provide a limit switch for detecting a lowermost position of the load in view of the safety in operation which would possibly make the hoist complicated.

SUMMARY OF THE INVENTION

It is therefore a primary object of the invention to provide an improved electric hoist which solves these problems of the prior art.

It is a general object of the invention to provide an improved hoist which comprises in its reduction gear mechanism an overload safety device including radially inward and outward dual friction plates and a one-way clutch for changing-over the friction plates to transmit the torque through the radially outward friction plates in winding-up and through both the radially outward and inward friction plates in winding-off, thereby automatically preventing the lifting, lowering or dragging of a load under overload condition, and enabling the once lifted load to be securely lowered regardless of its light or heavy weight.

In order to achieve the above objects, the hoist including a shaft driven by external force, a driving shaft connected to said shaft, a reduction gear train for transmitting rotation of said driving shaft to a load sheave, and a mechanical brake assembly in said reduction gear train according to the invention comprises an overload safety device arranged in said reduction gear train, said overload safety device comprising a driven gear having a one-way clutch and rotatively driven by said driving shaft and radially inward and outward dual friction plates located between said driven gear and an element of said mechanical brake assembly to transmit torque through said radially outward friction plates in winding-up and through said radially inward and outward friction plates in winding-off.

In a preferred embodiment of the invention, the element of said mechanical brake assembly is a movable member threadedly engaged with a driven shaft of the mechanical brake assembly, and the driven gear having the one-way clutch is fitted on the movable member through a disc, and further the radially outward friction plates are interposed between the driven gear and radially outward retainer member fitted on the movable member through a radially inward retainer member by means of spline grooves or the like and between the driven gear and the movable member, and the radially inward friction plates are interposed between the disc and the radially inward retainer member and between the movable member and the disc, the radially inward and outward friction plates being urged by resilient urging means.

In order that the invention may be more clearly understood, preferred embodiments will be described, by way of example, with reference to the accompanying drawings.

DETAILED DESCRIPTION OF THE PREFERRED EMBODIMENT

Figure 1:
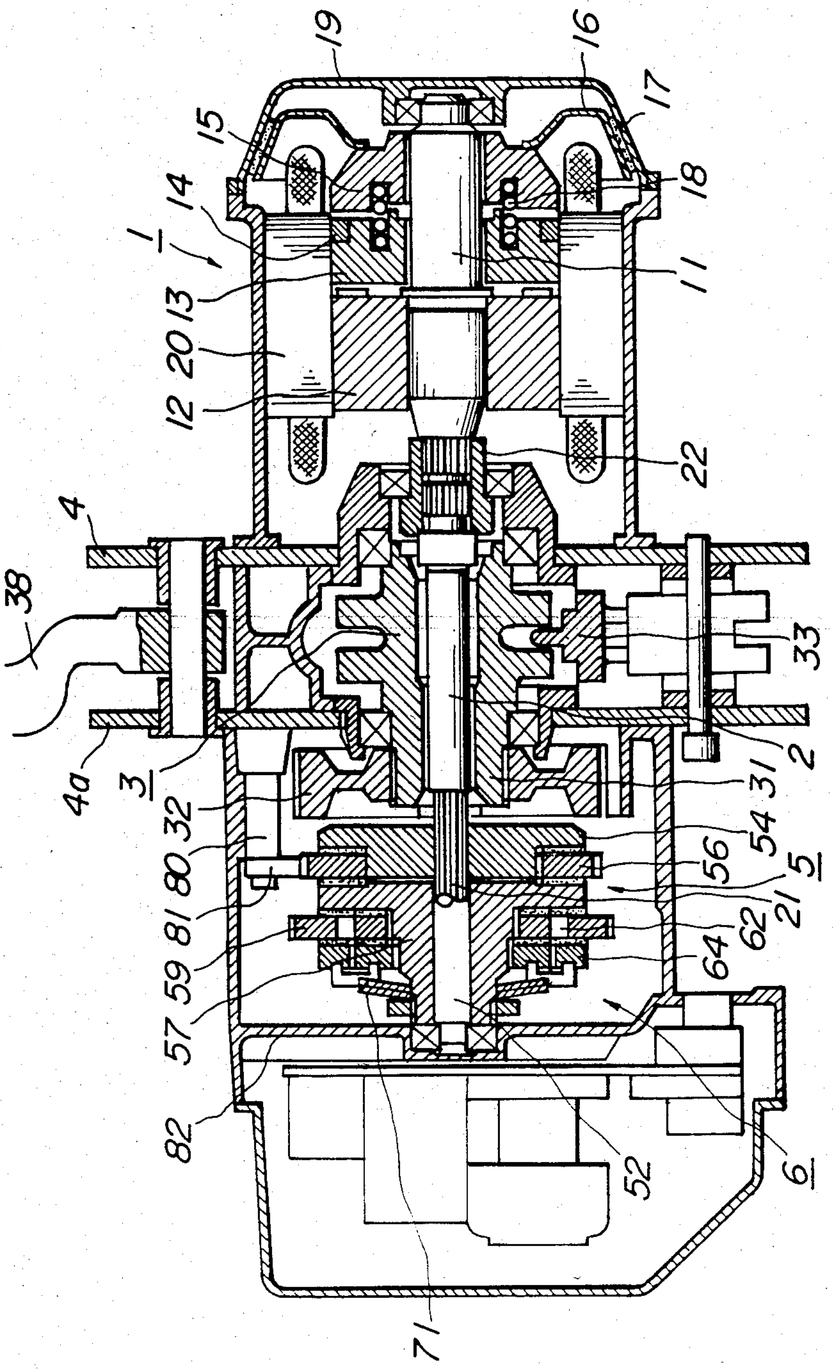
FIG. 1 is a longitudinal sectional view of one embodiment of a hoist according to the invention.

Referring to FIG. 1 illustrating one embodiment of the invention, an electric hoist comprises an electric motor 1 including a rotor 12 fixed to a rotor shaft 11, a magnetic pole member 13 and an attracted member 15 made of a magnetic material with a disc 16 provided on its outer periphery with a friction plate 17. The magnetic pole member 13 and the attracted member 15 are axially slidably fitted on the rotor shaft 11 with spline connections or the like. Between the magnetic pole member 13 and the attracted member 15 is interposed a spring 18 normally resiliently urging the attracted member 15 to the right as viewed in FIG. 1 to force the friction plate 17 against a front frame 19. The magnetic pole member 13 is made of a non-magnetic material and is provided on its one surface in opposition to the attracted member 15 with a number of attractor elements 14 made of a magnetic material radially embedded in the magnetic pole member 13. A reference numeral 20 denotes a stator of the motor.

The electric hoist further comprises a driving shaft 2 connected to the rotor shaft 11 through a connecting member 22 fitted onto the driving and rotor shafts 2 and 11 by means of spline grooves or the like. A load sheave 3 having at its one end a shaft 31 is loosely fitted on the driving shaft 2 and journaled in bearings in frames 4 and 4*a*. A driving gear 32 is fixedly fitted on the shaft 31 of the load sheave 3 through spline grooves or the like. A chain guide 33 is arranged in opposition to the load sheave 3.

Figure 2:
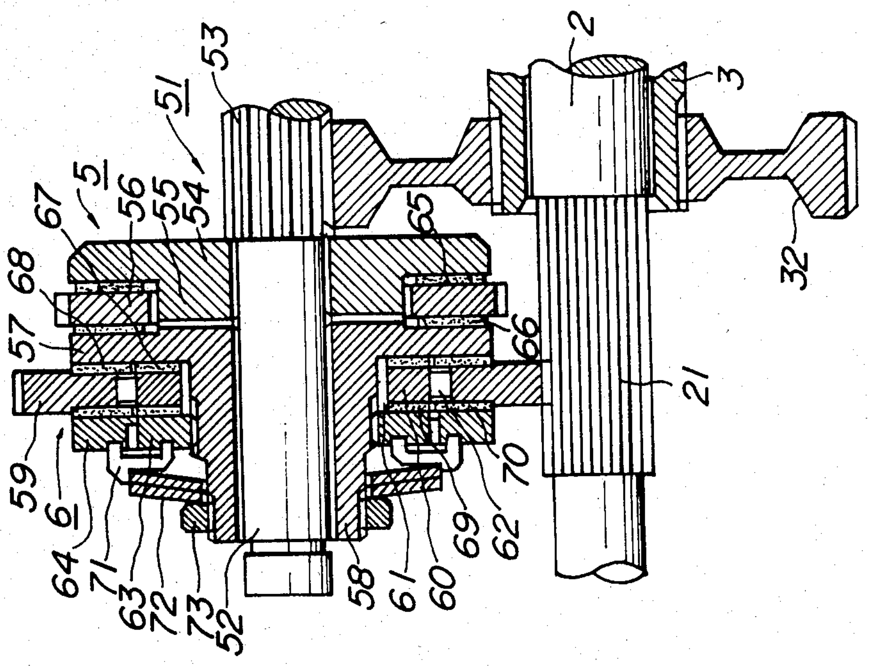
FIG. 2 is a sectional plan view of a reduction gear train used in the hoist shown in FIG. 1.
Figure 3:
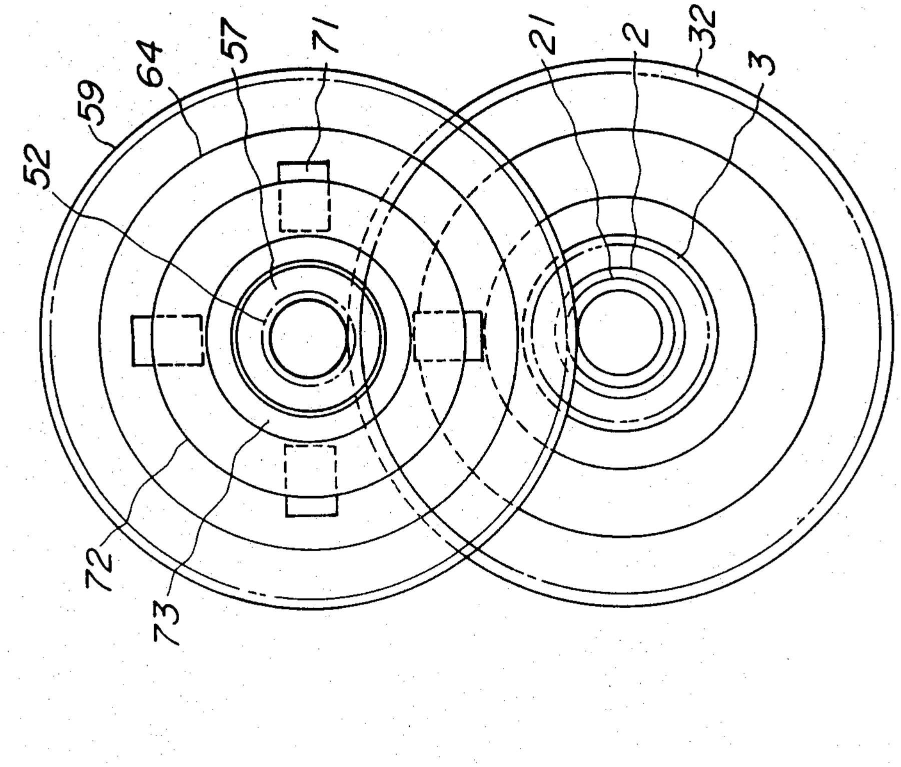
FIG. 3 is a front elevation of the gear train shown in FIG. 2.

A mechanical brake assembly 5 having an overload safety device 6 comprises as shown in FIGS. 2 and 3 a driven shaft 51 arranged in parallel with the driving shaft 2 and formed with a screw-threaded portion 52 and a pinion 53, a brake support member 54 having a boss 55 fixedly engaged with the screw-threaded portion 52 of the driven shaft 51, a brake ratchet wheel 56 loosely or rotatably fitted on the boss 55 of the brake support member 54, a movable member 57 having a shaft 58 threadedly engaged with the screw-threaded portion 52 of the driven shaft 51, a driven gear 59 in mesh with a pinion 21 formed in the driving shaft 2 and fitted on the shaft 58 of the movable member 57 through a bearing 61 and a disc 60, a radially inward retainer member 63 fitted on the shaft 58 through spline grooves or the like, a radially outward retainer member 64 fitted on the radially inward retainer member 63.

Figure 4:
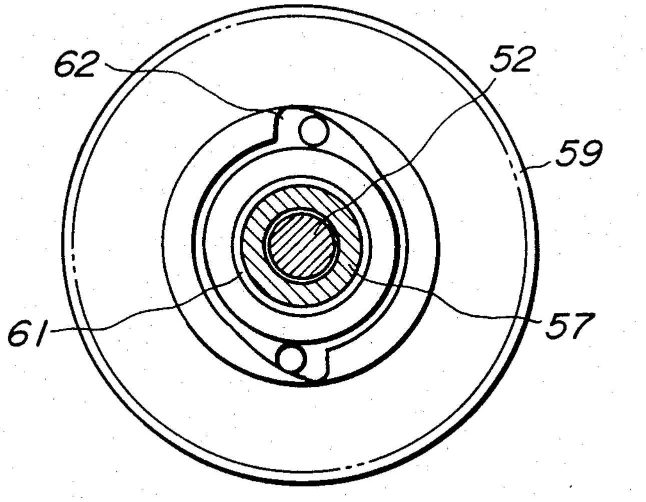
FIG. 4 is a sectional plan view of one embodiment of a one-way clutch used in an overload safety device in the hoist according to the invention.

Between the driven gear 59 and the disc 60 is arranged, for example, a one-way clutch 62 as shown in FIG. 4. When the drive gear 59 is rotated in a winding-up direction or a clockwise direction as viewed in FIG. 4, while the overload safety device 6 is being operated, the one-way clutch 62 is not actuated. However, the driven gear 59 is rotated in a winding-off direction or an anticlockwise direction as viewed in FIG. 4, the one-way clutch 62 is actuated to transmit the rotation. Friction plates 65 and 66 are arranged between the support member 54 and the movable member 57 respectively and the ratchet wheel 56. There are provided a radially inward friction plate 67 between the movable member 57 and the disc 60, a radially outward friction plate 68 between the movable member 57 and the driven gear 59, a radially inward friction plate 69 between the disc 60 and the radially inward retainer member 63, and a radially outward friction plate 70 between the driven gear 59 and the radially outward retainer member 64. The radially inward and outward retainer members 63 and 64 are connected by means of spline grooves or the like.

Spring support members 71 are arranged equally angularly spaced in a circle on the radially inward and outward retainer members 63 and 64 in a manner bridging over the retainer members and have at their radially inward and outward ends projections fitted in grooves formed in the radially inward and outward retainer members 63 and 64. Resilient urging means 72 such as dish-shaped springs are arranged on the shaft 58 of the movable member 57 and urge the above mentioned members and friction plates toward the right as viewed in FIG. 2, whose urging force is adjusted by an adjusting nut 73. Moreover, the pinion 53 of the driven shaft 51 is in mesh with the driving gear 32.

A brake pawl 81 is pivotally mounted on a shaft 80 fixed to the frame 4*a* as shown in FIG. 1 and urged by a spring (not shown) to engage the ratchet wheel 56. Reference numeral 82 denotes a rear frame. A hook 38 serves to hang the electric hoist from a ceiling or cross girder. The rotor shaft 11 and driving shaft 2 are journaled in bearings in the front frame 19, frames 4 and 4*a* and rear frame 82. The driven shaft 51 is also journaled in bearings in the frames 4*a* and the rear frame 82.

The operation of the electric hoist constructed as above mentioned according to the invention will be explained hereinafter. When the motor 1 is energized for lifting or winding up a load, the attractor elements 14 in the magnetic pole member 13 are magnetized to attract the attracted member 15 to the magnetic pole member 13 against the force of the spring 18 so that the disc 16 is moved to the left as viewed in FIG. 1 to release the braking action of the friction plate 17 and permit the rotor shaft 11 to be rotated. The rotation of the rotor shaft 11 is transmitted through the connecting member 22, to the driving shaft 2 to rotate through the pinion 21 the driven gear 59 in the winding-up direction.

The rotation of the driven gear 59 is transmitted through the radially outward friction plate 70, radially outward retainer member 64, radially inward retainer member 63 and radially outward friction plate 68 to the movable member 57. As the movable member 57 rotates, it moves to the right as viewed in FIG. 2 on the screw-threaded portion 52 of the driven shaft 51 owing to the threaded engagement therebetween to join the ratchet wheel 56 and the friction plates 65 and 66 into a frictionally combined unit, so that the rotation of the driving shaft 2 is transmitted to the driven shaft 51 through the driven gear 59, radially outward friction plates 68 and 70, movable member 57, friction plate 66, ratchet wheel 56, friction plate 65 and support member 54. Accordingly, the driven shaft 51 is rotated to cause the load sheave 3 to be rotated through the driving gear 32 engaged with the pinion 53, so that the load is lifted by a chain (not shown) would about the load sheave 3. It is of course understood in this case that the rotating speed of the driving shaft 2 is considerably reduced through the reduction gear train including the pinion 21, driven gear 59, pinion 53 and driving gear 32 to be transmitted to the load sheave 3.

If the weight of a load is more than a rated value, the radially outward friction plate 68 of the overload safety device 6 is slipped relative to the driven gear 59 or movable member 57 and the radially outward friction plate 70 is slipped relative to the driven gear 59 or radially outward retainer member 64, so that the torque of the driving shaft 2 is not transmitted to the driven shaft 51. As the load cannot be lifted under such a condition of the hoist, the hoisting or dragging of the overload is automatically prevented.

When the motor 1 is deenergized, the attracted body 15 is returned to its original position by means of the spring 18 to urge the friction plate 17 against the front frame 19 to cause the braking action which holds the hoisted load in its position.

When it is required to lower the load, the motor 1 is energized to rotate the rotor shaft 11 in a reverse direction. The rotation of the rotor shaft 11 is transmitted through the connecting member 22 to the driving shaft 2 which is then rotated in the winding-off direction. The rotation of the driving shaft 2 is then transmitted to the pinion 21 and driven gear 59 so that the load is lowered with the aid of the mutual action of the weight of the load and the mechanical brake assembly 5.

If an overload occurs during lowering the load, the radially outward friction plate 68 is slipped relative to the driven gear 59 or movable member 57 and the radially outward friction plate 70 is slipped relative to the driven gear 59 or the radially outward retainer member 64. On the other hand, the one-way clutch 62 is brought into an operative condition, so that the disc 60 is rotated with the driven gear 59 in unison. The radially inward friction plate 67 is therefore slipped relative to the disc 60 or movable member 57, and the radially inward friction plate 69 is also slipped relative to the disc 60 or radially inward retainer member 63. The torque of the driving shaft 2 is not transmitted to the driven shaft 51 owing to the slippage at the two locations. Accordingly, even if a stopper (not shown) provided on one end of the chain wound about the load sheave 3 remote from the other end suspending the load strikes the chain guide 33 at the lowermost position of the load, the lowering of the load is stopped without any damage of the chain guide 33, thereby automatically preventing the lowering of the overload. The electric hoist according to the invention can therefore dispense with a limit switch for detecting the lowermost position for winding-off a load.

Moreover, even if the mechanical brake assembly 5 is clamped to an excess extent when a lifting load is stopped, the load can be securely lowered without stoppage of the load during lowering because the winding-off torque of the overload safety device 6 has been set to be larger than the friction transmission force of the mechanical brake assembly 5.

Figure 5A:
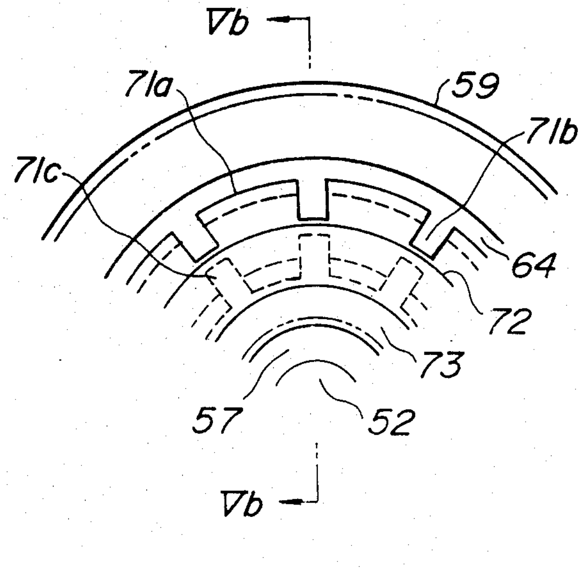
FIG. 5*a* is a front elevation illustrating another embodiment of a spring support member used in the overload safety device in the hoist according to the invention.
Figure 5B:
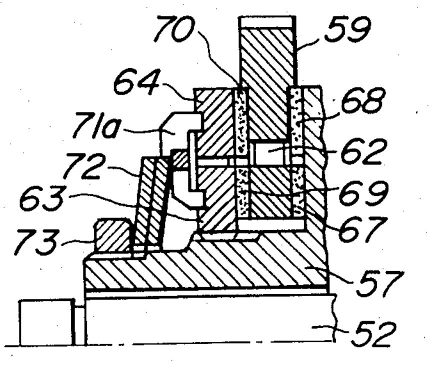
FIG. 5*b* is a sectional view of the members taken along the line Vb—Vb in FIG. 5*a*.

Referring to FIGS. 5a and 5b illustrating another embodiment of the spring support member for the radially inward and outward retainer members 63 and 64 according to the invention, a spring support member 71a is made in an annular body formed with radial cuts 71b and 71c in its radially outward and inward peripheries and with projections adapted to be fitted in grooves concentrically formed in the radially inward and outward retainer members 63 and 64. In this modification, the spring support member 71a is constructed as above described so as to lower its rigidity to increase its flexibility, so that even if the radially inward and outward retainer members 63 and 64 are inclined or misaligned relative to an axis of the driven shaft 51, they are always urged uniformly by the resilient urging means 72.

In the above description, the invention is explained in conjunction with an electric hoist. However, this invention is not limited to this application but can be applied to manually operated hoists. Moreover, one example of the one-way clutch for use in the overload safety device has been shown in FIG. 2. However, any other one-way clutches may be used for this purpose. Moreover, instead of the screw type mechanical brake assembly, a cam type mechanical brake assembly may be used.

As can be seen from the above description, the hoist according to the invention comprises in its reduction gear mechanism an overload safety device including radially inward and outward dual friction plates and a one-way clutch for changing-over the friction plates to transmit the torque through the radially outward friction plates in winding-up and through both the radially outward and inward friction plates in winding off, thereby automatically preventing the lifting, lowering or dragging of a load under overload condition, and enabling the once lifted load to be securely lowered regardless of its light or heavy weight. Therefore, the electric hoist according to the invention brings about significant effects in actual use.

It is further understood by those skilled in the art that the foregoing description is that of preferred embodiments of the disclosed hoists and that various changes and modifications may be made in the invention without departing from the spirit and scope thereof.

What is claimed is:

1. A hoist including a shaft driven by external force, a driving shaft connected to said shaft, a reduction gear train for transmitting rotation of said driving shaft to a load sheave, and a mechanical brake assembly in said reduction gear train, said hoist comprising an overload safety device arranged in said reduction gear train, said overload safety device comprising a driven gear having a one-way clutch and rotatably driven by said driving shaft, a movable member threadedly engaged with a driven shaft of said mechanical brake assembly, a disc rotatably arranged on said movable member and carrying thereon said one-way clutch, radially inward friction plates interposed between said movable member and said disc and between said disc and a radially inward retainer member fitted axially slidably but against rotation on said movable member and radially outward friction plates arranged outwardly of said radially inward friction plates and between said driven gear and said movable member and between said driven gear and a radially outward retainer member axially slidably but against rotation on said radially inward retainer member, and resilient urging means for urging said radially inward and outward friction plates.

2. A hoist as set forth in claim 1, wherein said resilient urging means is at least one dish-shaped spring and is made adjustable by a nut threadedly engaged on said movable member.

3. A hoist as set forth in claim 2, wherein between said resilient urging means and said radially inward and outward retainer members are interposed spring support members equally angularly spaced in a circle on said radially inward and outward retainer members in a manner bridging over said retainer members, and said spring support members having at their radially inward and outward ends projections to be fitted in grooves formed in said radially inward and outward retainer members.

4. A hoist as set forth in claim 1, wherein between said resilient urging means and said radially inward and outward retainer members is interposed a spring support member of an annular body formed with radial cuts in its radially outward and inward peripheries and with projections to be fitted in grooves concentrically formed in said radially inward and outward retainer members.

5. A hoist as set forth in claim 1, wherein said one-way clutch comprises steel rollers and a disc having recesses for embracing balls therein with the aid of a disc located radially inwardly of the first mentioned disc to connect said clutch when it is rotated in one direction.

* * * * *